United States Patent [19]

Huber

[11] 4,321,144

[45] Mar. 23, 1982

[54] PROCESS FOR PRODUCING FULLY DESALTED PROCESS WATER

[75] Inventor: Adalbert Huber, Holzwickede, Fed. Rep. of Germany

[73] Assignee: UHDE GmbH, Fed. Rep. of Germany

[21] Appl. No.: 146,377

[22] Filed: May 2, 1980

Related U.S. Application Data

[63] Continuation of Ser. No. 907,921, May 22, 1978, abandoned.

[30] Foreign Application Priority Data

May 24, 1977 [DE] Fed. Rep. of Germany ....... 2723297

[51] Int. Cl.³ .............................................. C02F 1/42
[52] U.S. Cl. .................................... 210/661; 210/664; 210/685
[58] Field of Search ............... 210/266, 283, 284, 289, 210/290, 291, 661, 663, 664, 669, 685

[56] References Cited

U.S. PATENT DOCUMENTS

| | | | |
|---|---|---|---|
| 3,197,401 | 7/1965 | Arai | 210/37 R |
| 3,458,436 | 7/1969 | Martinola et al. | 210/289 |
| 3,618,589 | 11/1971 | Tavani | 210/38 A |
| 3,711,401 | 1/1973 | Hamilton et al. | 210/38 R |
| 3,985,648 | 10/1976 | Casolo | 210/669 |

*Primary Examiner*—Ivars C. Cintins
*Attorney, Agent, or Firm*—Wilson, Fraser, Barker & Clemens

[57] ABSTRACT

Process for producing fully desalted process water by the treatment of raw water with cation and anion exchangers in a separate multi-stage arrangement. The water which leaves the main cation exchanger stage or stages, has a residual sodium content of less than 0.5 mg Na/l before entering the anion exchange stage. Such water is fed through a strong acid cation exchanger stage, in which the exchanger material is present at a maximum of 50 percent as a suspended bed and the remainder as a solid bed. The exchanger material in the strong acid cation exchanger stage following the first strong acid cation exchanger stage, is present at a maximum of 25 percent as a suspended bed and the remainder as a solid bed.

3 Claims, 4 Drawing Figures

PROCESS FOR PRODUCING FULLY DESALTED PROCESS WATER

This is a continuation of application, Ser. No. 907,921, filed May 22, 1978, now abandoned.

BACKGROUND OF THE INVENTION

The invention concerns a process for the preparation of fully desalted process water by treating the raw water with cation and anion exchangers in a separate multi-stage arrangement. In the following, process water signifies water, which is used both as water of addition for chemical, respectively physical processes, and as feed water for the production of steam. The collective concept process water is appropriate with the present-day coupling of steam-energy systems with process systems, both of the steam side and on the condensate side.

In the case of complete desalting systems, the degree of purity with respect to residual salts, acids and alkali is measured through the conductivity. A penetration of salts, acids or alkali through the desalting system has a devastating effect on the apparatus of the process system, in which the process water is used.

A large number of processes are known for the preparation of fully desalted process water; reference is made to the handbook "Wasser" (water), published by Vereinigte Kesselwerke AG, Duesseldorf, Issue of 1974, pages 101 to 135.

The state of the art is described, for example, by means of two characteristic processes, which are used for raw water with different analyses.

(a) Complete desalting process with strong acid cation exchanger, strong basic anion exchanger and mixed bed filter in accordance with FIG. 1a of the accompanying drawings.

The de-basification of the physically clean raw water is carried out in the cation exchanger a. By means of acid regeneration, the cation exchanger is charged with $H^+$ ions and is able to exchange all cations of the water against $H^+$ ions. This process is the de-basification because all cations are removed.

The removal of the anions of the weak and strong mineral acids, which are still contained in the water, is carried out in the anion exchanger b. This means that the anion exchanger is in a position to exchange the anions $CL^-$, $SO_4^{2-}$, $NO_3$, $CO_3^{2-}$, $SiO_3^{2-}$ against the accumulated OH ions.

The improvement of the desalting and desilification effect takes place in the mixed bed exchanger c. The mixed bed exchanger contains a mixture of strong acid cation and strong basic anion exchange material, which, during the operation is present in an intimately mixed solid bed condition. The adjacent cation and anion resin particles represent a very long chain of series-arranged cation and anion exchangers. The good desalting effect of the mixed bed exchanger is based on this fact.

(b) Complete desalting process with weak acid cation exchanger, strong acid cation exchanger, weak basic anion exchanger, $CO_2$ scrubbing tower, strong basic anion exchanger and a mixed bed filter in accordance with FIG. 1b of the accompanying drawing.

The decarbonation of the physically clean raw water is carried out in the weak acid cation exchanger d. The weak acid cation exchanger is charged with $H^+$ ions by means of acid regeneration and can exchange the cations of the weak acids against the accumulated $H^+$ ions.

The de-basification of the clean raw water is carried out in the strong acid cation exchanger e. By means of acid regeneration, the cation exchanger is charged with $H^+$ ions and is able to exchange all cations of the water against $H^+$ ions. This process is the de-basification, because all cations are removed.

The removal of the anions of the strong mineral acids is carried out in the weak basic anion exchanger f. This means that the weak basic anion exchanger is in a position to exchange the anions $CL^-$, $SO_4^{2-}$, $NO_3^-$ against the accumulated OH ions.

The expulsion of carbonic acid is carried out in the $CO_2$ scrubbing tower g. The carbonic acid has been generated from the hydrogen carbonates in the cation exchanger. In the $CO_2$ scrubbing tower, the water is vaporized in the upper portion and then runs over several levels, which are filled with plastic rings. In a counterflow, air is added to the water. By reducing the partial pressure for $CO_2$, the carbonic acid is removed to a value of less than 10 mg/l.

The anions of the weak mineral acids are removed by means of the strong basic anion exchanger h. This means that the strong basic anion exchanger exchanges the weak mineral acids such as $CO_3^{2-}$, $SiO_3^{2-}$ againt accumulated OH ions.

The improvement of the desalting and desilification effect takes place in the mixed bed exchanger j. The mixed bed exchanger contains a mixture of strong acid cation and strong basic anion exchange material, which, during the operation, is present in an intimately mixed solid bed condition. The adjacent cation and anion resin particles represent a very long chain of series-arranged cation and anion exchangers. The good effect of the residual desalting of the mixed bed exchanger is based on this fact.

FIGS. 1a and 1b are only examples, because a large number of variations are possible here. However, it is a significant characteristic that all configurations required a mixed bed filter so far.

The mixed bed filter following the anion exchangers becomes necessary because of the so-called sodium slip in the cation exchanger or exchangers. Because the cation exchangers cannot be designed for a residual content of Na compounds of practically zero, Na compounds leave the cation exchanger or exchangers in the order of magnitude of about 0.5 mg/l or more. These compounds are split in the strong basic anion exchanger into caustic soda in accordance with the equation $NaCl + OH.d \rightarrow Cl.d\ 3\ NOH$ (1) and cause a high conductivity of the mixed bed exchanger. d=ion exchanger mass.

The sodium slip is in the ratio of the monovalent to the bivalent cations in the water, which is to be purified. The slippage can be generally reduced or avoided by means of the following additional measures:

1. Air flushing of the cation exchanger prior to and after the regeneration for the purpose of the distribution of the exchanger layer in the lower area of the filter, which is more heavily charged with $Na^+$ ions.

2. The use of larger quantities of hydrochloric acid for regeneration.

3. The application of counterflow regeneration.

4. The introduction of an additional cation exchanger following the weak basic anion exchanger for the purpose of the residual splitting of the Na compounds coming out of the first cation exchanger. For FIG. 1b, this means the interposition of an additional cation exchanger after position 3.

The consumption of chemicals of a complete desalting system, designed in accordance with FIG. 1b, for 200 tons of fully desalted process water per hour, with a raw water analysis of:

| pH value | | 7.50 | |
|---|---|---|---|
| Total hardness | | 17.2 | °d |
| Carbonate hardness | | 8.6 | °d |
| CaO | | 125 | mg/l |
| MgO | | 34 | " |
| $CO_2$ - free | | 37 | " |
| $NO_3$ | | 46 | " |
| Cl | | 46 | " |
| $SO_4$ | | 109 | " |
| $SiO_2$ | | 9 | " |
| $KM_nO_4$ consumption | | 4 | " |
| is calculated as: | | | |
| HCl | 30 percent | 1,644 tons per year | |
| NaOH | 50 percent | 699 tons per year | |

If, on the basis of an analysis, which deviates from the above example, a greater sodium slip results, the consumption of chemicals and the required resources for apparatus and measuring technology would be considerably greater as a consequence of measures 1 to 4.

SUMMARY OF THE INVENTION

The invention is based on the objective of reducing the consumption of chemicals and thus the impact on the environment.

In accordance with this invention, this problem is solved in that the water leaving the cation exchanger stage or stages with a residual sodium content of less than 0.5 mg Na/l is fed through a strong acid cation exchanger stage, prior to entering into the anion exchanger stage, wherein the exchanger material is present as suspended bed to a maximum of 50 percent and the remainder as solid bed.

The residual conductivity can be reduced especially well when, in accordance with a further embodiment of the invention, the exchanger material in the strong acid cation exchanger stage, which follows the first strong acid main cation exchanger stage, is present as a suspended bed to a maximum of 25 percent and the remainder as a solid bed.

A complete desalting apparatus for carrying out the process in accordance with this invention is characterized in that the strong acid main cation exchanger bed is followed by a further bed with strong acid cation exchanger material and the bed evidences, on the inlet side, a known distribution device for the inflowing water and, on the outlet side, a known sieve device for the exchanger material and whereby the suspended bed proportion between the two devices amounts to a maximum of 50 percent.

The advantages obtained with the invention consist of the fact that the Na proportion passing through or leaving the strong acid cation exchanger, which is also designated as "sodium slip", is almost completely removed in the next-following strong acid cation exchanger. A condition for this is that a small portion of the exchanger material, about 5 to 40 percent, is present as a suspended bed and the remainder in the upper portion of the container as solid bed. For the later description of the process in accordance with this invention, the first strong acid cation exchanger is designated as "working filter" and the next-following strong acid cation exchanger with suspended bed and solid bed is designated as "fine purification filter".

By means of the series-arrangement of the fine purification filter in accordance with this invention, it is accomplished that the Na ions, which are present as sodium slip, do not reach the anion exchangers and load them in an undesirable manner. The splitting of Na compounds, which have slipped through, in accordanc with equation (1) is no longer possible because Na compounds no longer reach into the anion exchanger. They are collected in the fine purification filter. The mixed bed exchanger, which is series-connected in the conventional complete desalting systems can be omitted.

The calculation of the capacity of the complete desalting system is a function only of the raw water analysis and the regeneration cycle. The fine purification filter in accordance with this invention is not taken into consideration in the calculation of the capacity. However, in comparison with the conventional complete desalting system in accordance with FIG. 1b with the mixed bed filter at the end of the system, a reduced chemicals consumption results for the same raw water analysis, namely only of

| HCl | 30 percent | 1,562 tons per year |
|---|---|---|
| NaOH | 50 percent | 645 tons per year. |

The difference of 82 tons per year HCl and of 44 tons per year NaOH corresponds to a reduction of 5, respectively 6.3 percent and is of special significance for the contamination of the waste regeneration water.

DESCRIPTION OF THE PREFERRED EMBODIMENTS

Figure 1A:
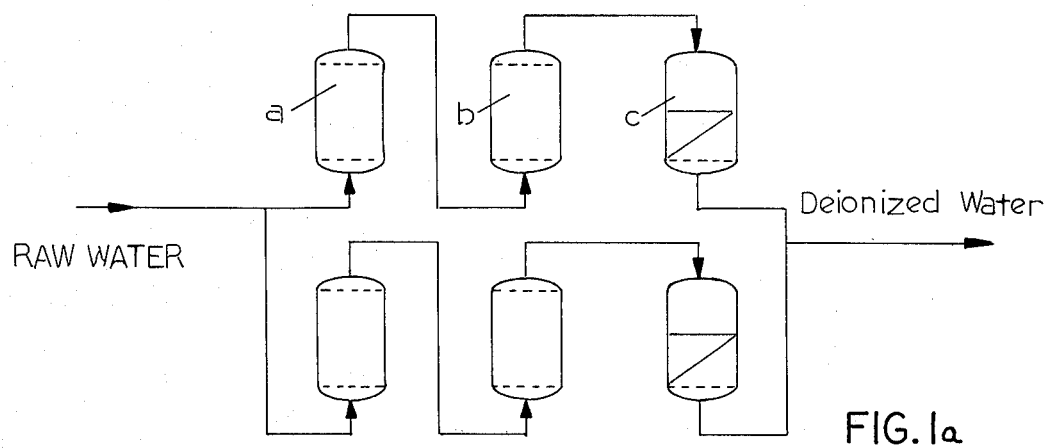
FIG. 1a is a diagrammatic view as to the state of the art showing a complete desalting process with strong acid cation exchanger, strong basic anion exchanger and mixed bed filter.
Figure 1B:
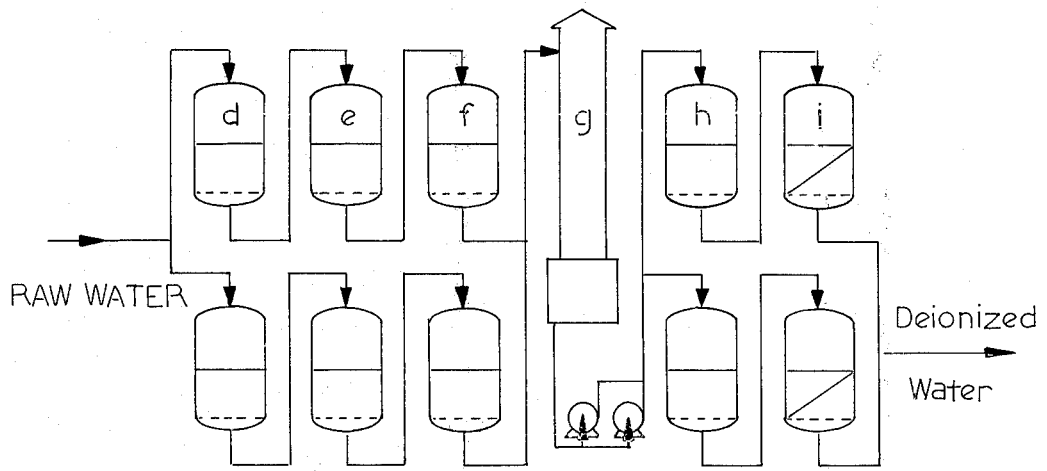
FIG. 1b is a diagrammatic view as to the state of the art showing a complete desalting process with weak acid cation exchanger, $CO_2$ scrubbing tower, strong basic anion exchanger, and a mixed bed filter.
Figure 2A:
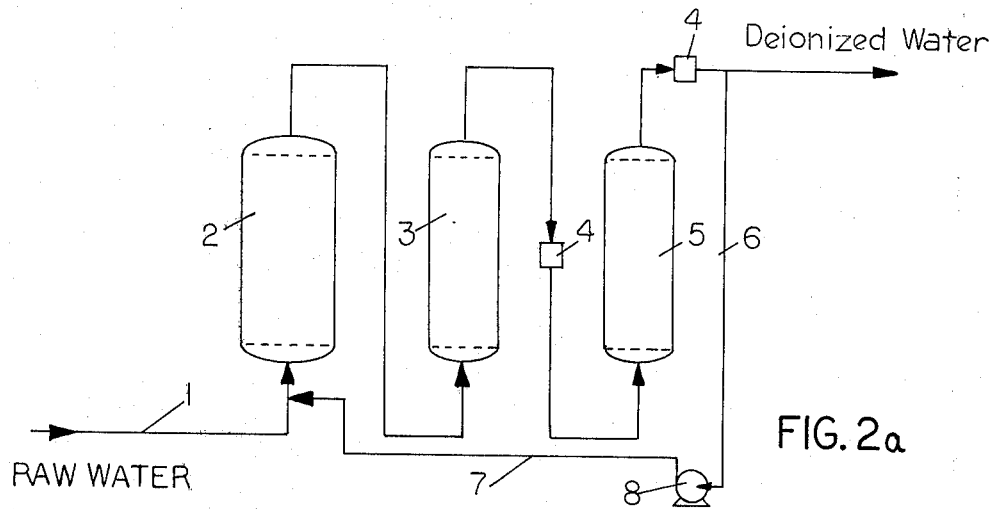
FIG. 2a is a diagrammatic view of an embodiment of the invention showing a complete desalting system with single-stage working filters.

In accordance with FIG. 2a, raw water flow through line 1 into the bottom of a strong acid cation exchanger 2, which is designed as a "working filter". With a residual content of a maximum of 0.5 mg Na/l, the water leaves the working filter 2 and is then fed into a "fine purification filter" 3 for the complete accumulation of the residual Na compounds. The degree of exhaustion of the "working filter" 2 is determined by the measurement of the pH value following the working filter. Before the water, which has been completely freed of Na compounds, enters the anion exchanger 5, it is advantageously also fed through a resin catch 4, where fine exchanger resin particles are retained. In the next-following anion exchanger 5, cation exchanger particles have a deleterious effect. Another resin catch 4 follows the anion exchanger 5, which supplies a fully desalted process water, because fine exchanger resin particles in the process water, the deionized water, are undesirable. Through lines 6 and 7, a circulation pump 8 with the aid of valves and dampers, which are not shown in the drawing, the final scrubbing of the complete desalting system is carried out in a known manner.

Figure 2B:
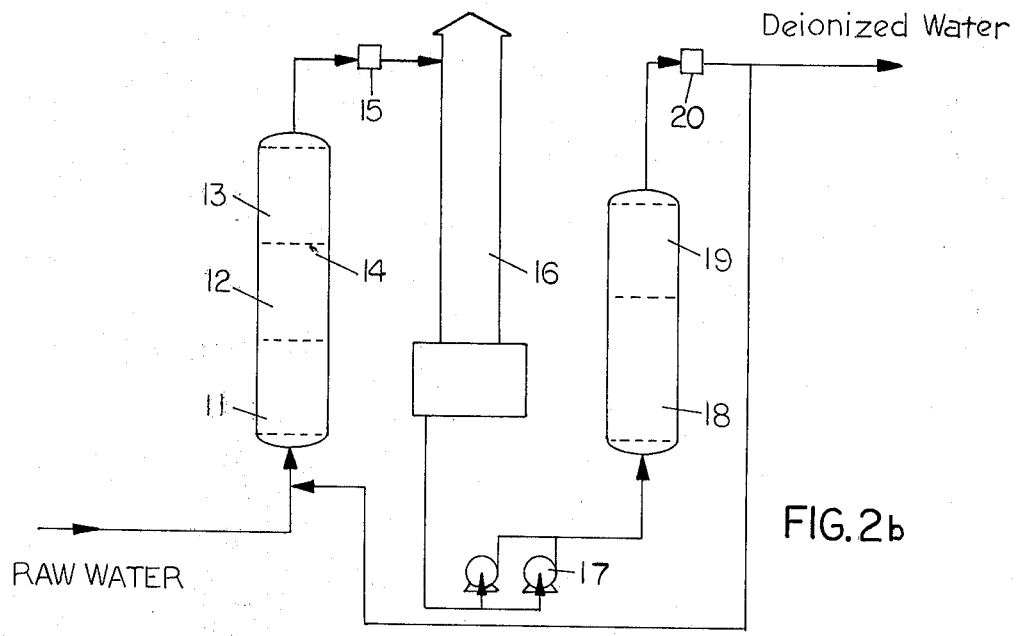
FIG. 2b shows a complete desalting system in accordance with the invention with two-stage working filters.

In the complete desalting system illustrated in FIG. 2b, the cation exchanger stage consists of a weak acid cation exchanger 11 and a strong acid cation exchanger 12. A fine purification filter 13 above the cation exchanger 12 is separated by a distribution device, a tuyere bottom 14. In this manner, it is assured that the fine purification filter 13 need only take care of the removal of the sodium slip. The $CO_2$ scrubbing tower 16 follows a resin catch 15 in the flow of the water. The $CO_2$ scrubbing tower 16 serves for the removal of the carbonic acid. An intermediate pump 17, or several intermediate pumps, as shown, follow the $CO_2$ scrubbing tower 16 for the purpose of overcoming the pressure losses. An anion exchanger stage is also built as a two-stage configuration, as a weak basic filter 18 and a strong basic working filter 19. Following a resin catch 20, fully desalted process water is delivered.

As illustrated in FIG. 2b, the process in accordance with this invention allows the application of a fine purification bed as partial apparatus directly on the first, respectively the second cation exchanger working filter, depending on the prevailing raw water analyses.

In the regeneration of the complete desalting system, it is flushed in the reverse direction, i.e. distribution and sieving devices, which are installed, must assume the opposite functions during the reverse flow direction.

What I claim is:

1. A process for producing fully desalted process water comprising:
   a. flowing raw water through a strong acid cation exchanger such that the residual sodium content of the water leaving said exchange is 0.5 milligrams or less per liter;
   b. subsequently feeding said treated water into a second strong acid cation exchanger, wherein the exchanger comprises up to 50 percent suspended bed and the remainder as a solid bed, such that substantially no residual sodium compounds remain in said water leaving said second cation exchanger;
   c. subsequently feeding said treated water through a first resin catch such that fine exchanger resin particles are removed from said treated water;
   d. subsequently feeding said treated water to an anion exchanger; and
   e. subsequently feeding said reacted water to a second resin catch which supplies a fully desalted process water.

2. A process according to claim 1 wherein the second strong acid cation exchanger comprises up to 25% suspended bed and the remainder as a solid bed.

3. A process for producing fully desalted process water comprising:
   a. flowing raw water through a weak acid cation exchanger;
   b. subsequently feeding said treated water into a strong acid cation exchanger such that the residual sodium content of the water leaving said exchanger is 0.5 milligrams or less per liter;
   c. subsequently feeding said treated water into a second strong acid cation exchanger, wherein the exchanger comprises up to 50 percent suspended bed and the remainder as a solid bed, such that substantially no residual sodium compounds remain in said water leaving said second cation exchanger;
   d. subsequently feeding said treated water through a first resin catch such that fine exchanger resin particles are removed from said treated water;
   e. subsequently feeding said treated water to a $CO_2$ scrubbing tower to remove carbonic acid;
   f. subsequently increasing the pressure of said scrubbed water through the use of one or more pumps;
   g. subsequently feeding said treated water to a weak basic anion exchanger;
   h. subsequently feeding said treated water to a strong basic anion exchanger; and
   i. subsequently feeding said treated water through a second resin catch which supplies a fully desalted process water.

* * * * *